April 26, 1927.  
W. A. HILLER  
FLEXIBLE COUPLING  
Filed June 1, 1926  
1,626,195  
2 Sheets-Sheet 2

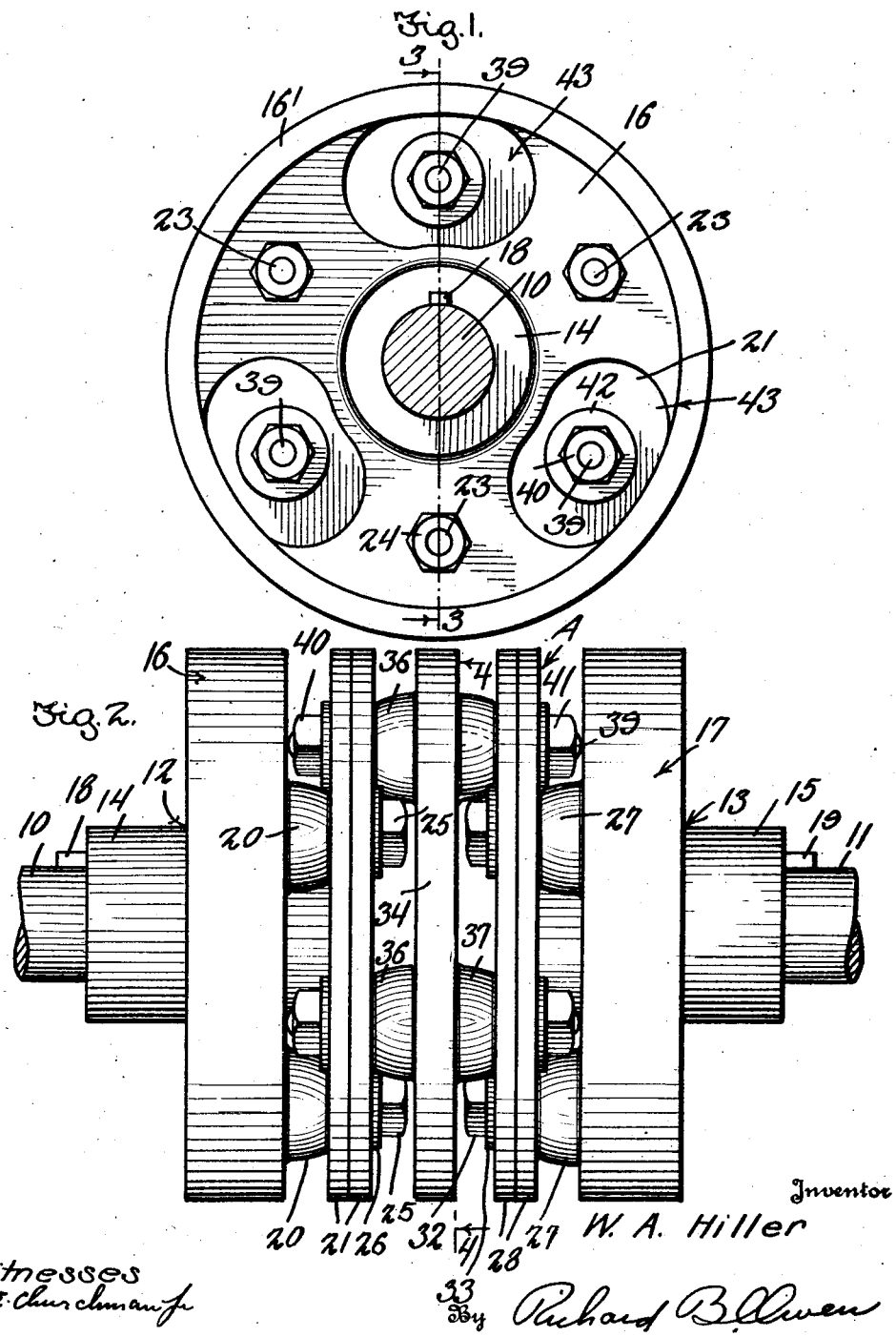

Witnesses  
C. E. Churchman Jr.

W. A. Hiller, Inventor  
By Richard B. Owen  
Attorney

Patented Apr. 26, 1927.

1,626,195

UNITED STATES PATENT OFFICE.

WILLIAM A. HILLER, OF MANOR, TEXAS.

FLEXIBLE COUPLING.

Application filed June 1, 1926. Serial No. 113,023.

This invention relates broadly to couplings and more particularly to new and useful improvements in flexible shaft couplings primarily designed for detachably connecting the driving end of one shaft to the driven end of another shaft.

An important object of the present invention is to provide such a coupling of the character stated including a pair of coupling members adapted to receive the adjacent ends of the coupled shafts, together with means for insulating the said coupling members and shafts one from the other.

Another object of the present invention is to provide such a coupling of the character stated including a pair of coupling members and new and novel means for securing the same together whereby to permit the coupling of the shafts so that they will run smoothly even though the axes thereof may vary in a slight degree from a position of axial alinement.

Another object of the present invention is to provide such a coupling consisting of a minimum number of parts, all of which may be readily assembled and disassembled relative to one another so that any worn or broken parts may be quickly and easily renewed.

A further object of the present invention is to provide such a coupling wherein the various parts are so constructed and arranged whereby to produce a minimum of noise and vibration and which will further subject the connecting parts to a minimum amount of wear.

A still further object of the present invention is to provide such a coupling which is extremely simple yet durable in its construction, practical and efficient in its use, and which may be manufactured and placed on the market at a reasonable cost.

With these and numerous other objects in view, the invention resides in the novel construction, combination and formation of parts as will be more fully hereinafter described, illustrated in the accompanying drawings and particularly pointed out in the appended claim.

In the drawings forming a part of this application and wherein like characters of reference denote corresponding parts throughout the several views:

Figure 1 is an end view of a coupling constructed in accordance with the present invention.

Figure 2 is a side view thereof.

Figure 3:
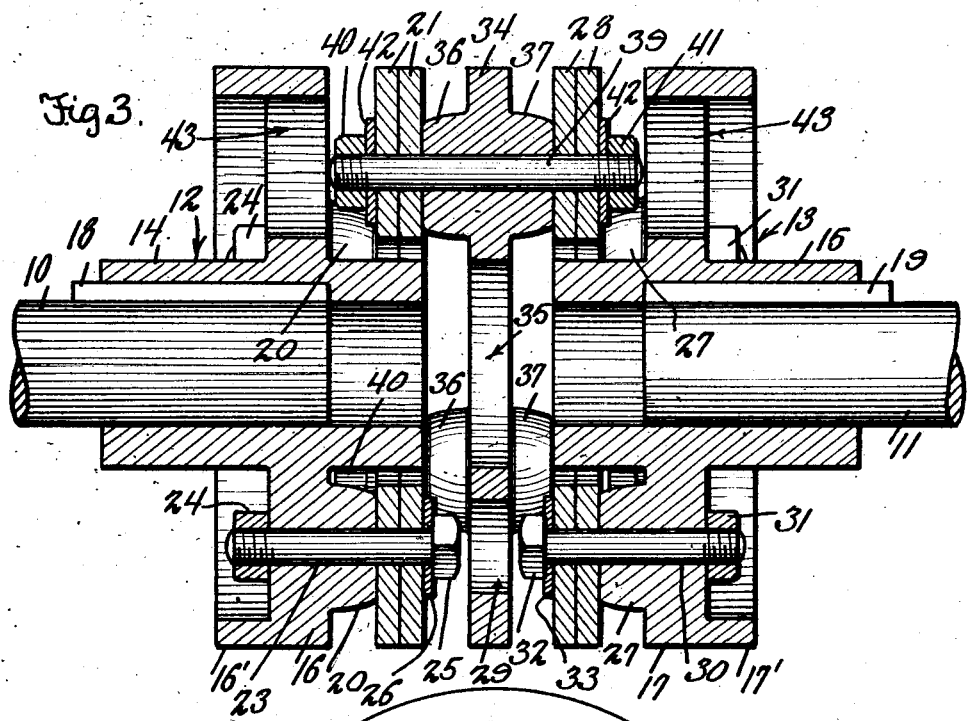
Figure 3 is a sectional view taken on line 3—3 of Figure 1.
Figure 4:
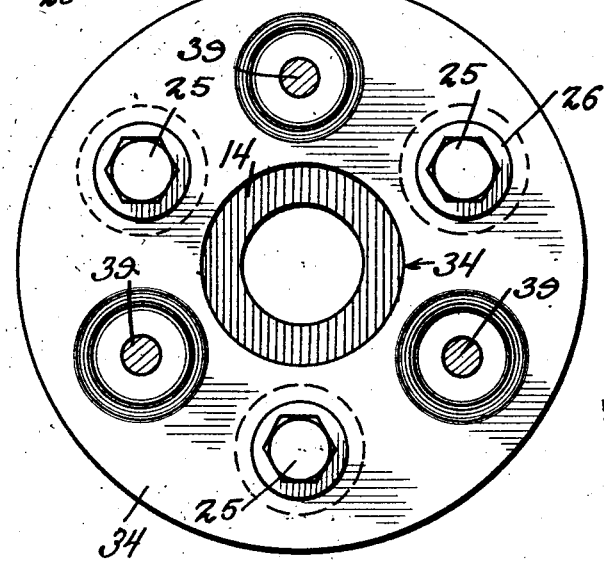
Figure 4 is a sectional view taken on line 4—4 of Figure 2.

Referring now more particularly to the accompanying drawings wherein for the purpose of illustration has been disclosed a preferred embodiment of the present invention, the letter A generally indicates the present improved flexible shaft coupling for connecting the adjacent ends of the separated shafts 10 and 11 together.

The coupling A embodies in its construction the two coupling members 12 and 13 including the collars 14 and 15 which form hubs for the disks 16 and 17, said disks being formed on the said collars approximately intermediate the ends thereof and said disks 16 and 17 being further provided with the right angularly directed annular peripheral flanges 16' and 17'. The adjacent ends of the shafts 10 and 11 are arranged to be received within the collars 14 and 15 and are fixed therein against rotation by means of the keys 18 and 19, said keys permitting the shafts to be adjusted longitudinally if so desired.

Formed on the inner face of the disk 16 of the coupling member 12 at spaced points around the collar 14 are the inwardly extending spacing lugs 20 and encircling the inner portion or end of the said collar 14 and engaging the end faces of the said lugs 20 are a pair of flexible disks 21 which may be of any desired material such as rubber or the like. The flexible disks 21 are secured to the coupling member 12 by means of the securing bolts 23 which pass transversely through the disk 16 and lugs 20 and also through the said flexible disks 21. The outer ends of the bolts 23 receive the usual nuts 24 while positioned between the heads 25 of the said bolts and the adjacent flexible disk 21 are suitable washers 26.

The coupling member 13 is of identical construction to the coupling member 12 and the inner face of the disk 17 thereof is also provided at spaced points around the collar 15 with the spacing lugs 27, said lugs 27 being preferably of the same construction as the lugs 20 and in substantially horizontal alinement therewith. Encircling the inner end of the collar 15 of the coupling member 13 and engaging the end faces of the said lugs 27 are the flexible disks 28 which are secured to the said coupling member 13 through the medium of the securing bolts 30, said bolts passing transversely through the disk 17, the lugs 27 and the flexible disks 28. The outer ends of the said bolts receive the usual nuts 31 while positioned between the heads 32 of the said bolts and the adjacent flexible disk 28 are suitable washers 33.

Positioned between the coupling members 12 and 13 is the key disk 34 formed with a central opening 35 and a plurality of smaller openings 29 surrounding the central opening. Formed upon the opposite side faces of the key disk 34 between the openings 29 therein are the oppositely directed horizontally alined spacing lugs 36 and 37 which serve to retain the said key disk properly spaced from the flexible disks 21 and 28. The key disk is secured to the flexible disks 21 and 28 through the medium of the securing bolts 39 which pass through the said key disk 34, the lugs 36 and 37 and also through the flexible disks 21 and 28, the opposite ends of the said bolts 39 being threaded to receive the nuts 40 and 41, suitable washers 42 being positioned between the said nuts and the adjacent flexible disks.

The lugs 36 and 37 on the key disk 34 are positioned between or in staggered relation to the lugs 20 and 27 on the coupling members 12 and 13 so that the bolts 39 are arranged between the bolts 23 and 30 as will be clearly seen upon reference to the drawings. In order that the nuts 40 and 41 may be easily and quickly removed or replaced, the disks 16 and 17 of the coupling members are provided between the lugs 20 and 27 with suitable enlarged openings 43 to receive therethrough a wrench or the like which may be used when removing or replacing the said nuts 40 and 41 on the bolts 39. The openings 29 in the key disk 34 not only serve to reduce the weight thereof but also serve to receive therein the heads 25 and 32 of the bolts 33 and 30 respectively should these bolts be unusually large or should the lugs 36 and 37 on the key disks be smaller so as to bring the coupling members 12 and 13 closer together.

From the foregoing, it will be seen that there has been provided a flexible shaft coupling which will accomplish all of the objects and perform all of the functions claimed. The provision of the flexible disks 21 and 28 will permit the coupling members 12 and 13 to be moved laterally relative to one another without affecting the smooth running of the shafts. It will be appreciated that any desired number of flexible disks may be used and that the various disks may be spaced from one another any suitable distance.

While there has been shown and described a preferred embodiment of the present invention, it is to be understood that changes in the details of construction may be resorted to without departing from or sacrificing the spirit of the invention so long as such changes fall within the scope of the appended claim.

What is claimed is:

In a flexible coupling of the character described, a pair of spaced disc members having centrally arranged aligned hubs, each of said disc members having an annular series of openings formed therethrough, axially extending opposed centrally bored lugs carried by said disc members, a key disc arranged between said first mentioned disc members and having an annular series of apertures formed therethrough each aligning with and arranged between a pair of said aligned opposed lugs, an annular series of lugs projecting from each face of said key disc each being positioned opposite an opening of the adjacent one of the first mentioned disc members, said key disc lugs being arranged in oppositely directed pairs and having a bore passing therethrough from one side of the key disc to the other, flexible annular coupling elements overlying the lugs upon each side of said key disc and abutting the ends of the lugs of the adjacent one of the first mentioned disc members, securing bolts passing through each pair of lugs of the key disc and through the adjacent coupling elements to secure the same thereto and securing bolts passing through each lug of the pair of disc members and through the coupling elements lying thereagainst, to secure the coupling disc members thereto, said openings of said pair of disc members being provided and arranged to permit the removal of the securing elements associated with the key disc and the flexible coupling disc elements.

In testimony whereof I affix my signature.

WILLIAM A. HILLER.